(12) United States Patent
Vyvyan

(10) Patent No.: US 10,616,042 B2
(45) Date of Patent: *Apr. 7, 2020

(54) COLLABORATIVE TRIGGERS IN DISTRIBUTED AND DYNAMIC COMPUTING SYSTEMS

(71) Applicant: International Business Machines Corporation, Armonk, NY (US)

(72) Inventor: David Vyvyan, Southampton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/846,179

(22) Filed: Dec. 18, 2017

(65) Prior Publication Data

US 2019/0165993 A1    May 30, 2019

Related U.S. Application Data

(63) Continuation of application No. 15/827,812, filed on Nov. 30, 2017.

(51) Int. Cl.
*H04L 12/24*    (2006.01)

(52) U.S. Cl.
CPC ...... *H04L 41/0631* (2013.01); *H04L 41/0613* (2013.01); *H04L 41/0622* (2013.01);
(Continued)

(58) Field of Classification Search
CPC ............. H04L 41/0613; H04L 41/0622; H04L 41/0631; H04L 41/069; H04L 41/5003; H04L 41/0627
See application file for complete search history.

(56) References Cited

U.S. PATENT DOCUMENTS 6,847,962 B1    1/2005    Cochrane
7,428,220 B1    9/2008    Caronni et al.
(Continued)

FOREIGN PATENT DOCUMENTS

| CN | 104394149 A1 | 3/2015 |
|---|---|---|
| CN | 106599043 A1 | 4/2017 |
| WO | 2019106476 A1 | 6/2019 |

OTHER PUBLICATIONS

IBM: List of IBM Patents or Patent Applications Treated as Related, 2 pg.
(Continued)

*Primary Examiner* — Gil H. Lee
(74) *Attorney, Agent, or Firm* — Cuenot, Forsythe & Kim, LLC

(57) ABSTRACT

Using collaborative triggers within a distributed computing system can include, in response to detecting a first event of a selected type within a first node of the computing system, generating a first collaborative trigger having a query identifier correlated with the selected type of the event and distributing the first collaborative trigger through other nodes of the computing system so that the first collaborative trigger reaches an actor of the computing system. The computer-implemented method can include suppressing, within each node that distributes the first collaborative trigger, each other collaborative trigger having a same query identifier as the first collaborative trigger until a response to the first collaborative trigger is received from the actor.

7 Claims, 6 Drawing Sheets

(52) U.S. Cl.
CPC ........ *H04L 41/0627* (2013.01); *H04L 41/069* (2013.01); *H04L 41/5003* (2013.01)

(56) References Cited

U.S. PATENT DOCUMENTS

| | | | |
|---|---|---|---|
| 7,984,043 | B1 | 7/2011 | Waas |
| 8,145,652 | B2 | 3/2012 | Bent et al. |
| 8,260,826 | B2 | 9/2012 | Chen et al. |
| 8,285,710 | B2 | 10/2012 | Bent et al. |
| 8,386,515 | B2 | 2/2013 | Bent et al. |
| 8,458,166 | B2 | 6/2013 | Bent et al. |
| 8,458,208 | B2 | 6/2013 | Vyvyan |
| 8,626,747 | B2 | 1/2014 | Bent et al. |
| 9,183,260 | B2 | 11/2015 | Bent et al. |
| 9,251,293 | B2 | 2/2016 | Vyvyan |
| 9,460,173 | B2 | 10/2016 | Abrams et al. |
| 9,471,647 | B2 | 10/2016 | Bent et al. |
| 9,563,650 | B2 | 2/2017 | Balasubramanian et al. |
| 9,716,649 | B2 | 7/2017 | Bent et al. |
| 10,110,479 | B1 | 10/2018 | Ramachandran |
| 2005/0097569 | A1* | 5/2005 | Chandrasekaran ..... H04L 29/06 719/318 |
| 2007/0094166 | A1 | 4/2007 | Addison |
| 2009/0077036 | A1 | 3/2009 | Bent et al. |
| 2009/0125540 | A1 | 5/2009 | Dettinger et al. |
| 2010/0115100 | A1 | 5/2010 | Tubman et al. |
| 2012/0166610 | A1* | 6/2012 | Doh ................. H04L 67/12 709/223 |
| 2014/0089294 | A1 | 3/2014 | Shankar |
| 2014/0219278 | A1 | 8/2014 | Bent et al. |
| 2014/0280037 | A1 | 9/2014 | Petride |
| 2015/0149436 | A1 | 5/2015 | McKenna |
| 2016/0117369 | A1* | 4/2016 | Bent ................. G06F 16/2282 707/770 |
| 2017/0169071 | A1 | 6/2017 | Petri |
| 2019/0163775 | A1 | 5/2019 | Abrashkevich et al. |
| 2019/0163783 | A1 | 5/2019 | Abrashkevich et al. |
| 2019/0165992 | A1 | 5/2019 | Vyvyan |

OTHER PUBLICATIONS

Vyvyan, D., "Collaborative Triggers in Distributed and Dynamic Computing Systems," U.S. Appl. No. 15/846,179, filed Nov. 30, 2017, 43 pages.

Pino, C. et al., "Evaluation of federated database for distributed applications in e-government," In 2013 IEEE 7th Int'l. Conf. on Application of Information and Communication Technologies (AICT), Oct. 23, 2013, pp. 1-5.

"Working with the Federated Data" [online] eTutorials.org © 2008-2017 [retrieved Aug. 11, 2017], retrieved from the Internet: <http://etutorials.org/Misc/advanced+dba+certification+guide+and+reference/Chapter+7.+Federated+Database+Access/Working+with+the+Federated+Data/>, 6 pg.

Bent, G., et al., "A dynamic distributed federated database," In Proc. of 2nd Ann. Conf. on the International Technology Alliance, Sep. 2008, 6 pg.

Mell, P. et al., "The NIST definition of cloud computing," National Institute of Standards and Technology Special Publication 800-145, Sep. 2011, [retrieved Nov. 30, 2017], retrieved from the Internet: <https://dx.doi.org/10.6028/NIST.SP.800-145>, 7 pg.

Agrawal, A. et al., "Query Processing in Wireless Sensor Network," In Advances in Electronic and Electric Engineering, vol. 3, No. 1, pp. 1-6, 2013.

Bent, G., et al., "Experimental Evaluation of the Performance and Scalability of a Dynamic Distributed Federated Database," In Proc. of 3rd Ann. Conf. of the International Technology Alliance, Sep. 2009, 7 pg.

Stone, P.D. et al., "Query propagation behaviour in Gaian database networks," 2014, 8 pg.

WIPO Appln. PCT/IB2018/059036, International Search Report and Written Opinion, 9 pg.

* cited by examiner

COLLABORATIVE TRIGGERS IN DISTRIBUTED AND DYNAMIC COMPUTING SYSTEMS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This disclosure relates to distributed and dynamic computing systems. A distributed and dynamic computing system (DDCS) refers to a computing environment having a large number of geographically dispersed and inter-connected computing nodes or "nodes". The nodes are able to establish connections with one or more other nodes in a highly dynamic manner without a predetermined topology. In this regard, a DDCS is also characterized as being ad-hoc. Examples of topologies that may be used within a DDCS include hierarchical, cyclic, linear, and broad. Further, a given DDCS may be subdivided into portions, where each different portion is implemented using one of the example topologies such that the DDCS, when taken as a whole, includes multiple, different topologies.

Within a DDCS, some devices disconnect from the computing system and are able to reconnect through the same network. In other cases, devices disconnect from the computing system and are able to rejoin through a different network. In still other cases, device network connections may be relatively stable. Many of the devices within these modern computing systems include data and, as such, may be queried or asked to perform some computation(s) on data.

SUMMARY

One or more embodiments are directed to a computer-implemented method. The computer-implemented method can include, in response to detecting a first event of a selected type within a first node of a distributed computing system, generating a first collaborative trigger having a query identifier correlated with the selected type of the event and distributing the first collaborative trigger through other nodes of the computing system so that the first collaborative trigger reaches an actor within the distributed computing system. The computer-implemented method can include suppressing, within each node that distributes the first collaborative trigger, each other collaborative trigger having a same query identifier as the first collaborative trigger until a response to the first collaborative trigger is received from the actor.

One or more embodiments are directed to a distributed computing system. The computing system can include a plurality of nodes and an actor. The plurality of nodes are configured to initiate operations including, in response to detecting an event of a selected type, generating a first collaborative trigger having a query identifier correlated with the selected type of the event, distributing the first collaborative trigger through other ones of the plurality of nodes so that the first collaborative trigger reaches the actor, and suppressing, within each of the nodes that distributes the first collaborative trigger, each other collaborative trigger having a same query identifier as the first collaborative trigger until a response to the first collaborative trigger is received from the actor. The actor is configured to initiate operations including generating the response to the first collaborative trigger.

One or more embodiments are directed to a computer program product. The computer program product includes a computer readable storage medium having program instructions embodied therewith. The program instructions are executable by one or more processors to cause the one or more processors to initiate operations including, in response to detecting a first event of a selected type within a first node of a distributed computing system, generating a first collaborative trigger having a query identifier correlated with the selected type of the event and distributing the first collaborative trigger through other nodes of the distributed computing system so that the first collaborative trigger reaches an actor of the computing system. The program instructions are also executable by the one or more processors to cause the one or more processors to initiate operations including suppressing, within each node that distributes the first collaborative trigger, each other collaborative trigger having a same query identifier as the first collaborative trigger until a response to the first collaborative trigger is received from the actor.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
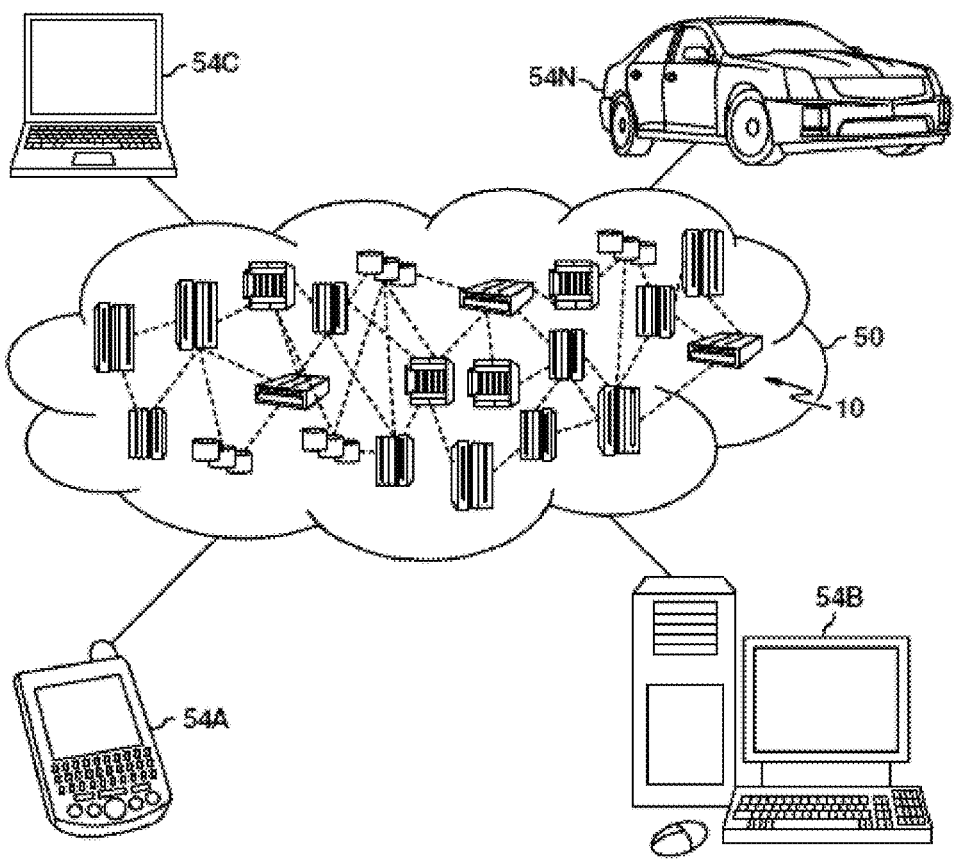
FIG. 1 depicts a cloud computing environment according to an embodiment of the present invention.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

One or more embodiments are directed to using collaborative triggers within a distributed and dynamic computing system (DDCS). In general, a collaborative trigger refers to a mechanism for distributing notifications among nodes of the DDCS. A collaborative trigger may serve as a notification of an occurrence of certain types of events within a data source within the DDCS and that require distributed responses. Once a given collaborative trigger is distributed within the DDCS, the nodes of the DDCS that distributed the collaborative trigger are prevented from repeating other collaborative triggers of the same type until a response to the original collaborative trigger is received by the respective nodes. Thus, in addition to providing a notification mechanism, a collaborative trigger effectively suppresses further notifications until such time that an actor is able to act on the original collaborative trigger. The actor is capable of acting on the original collaborative trigger by initiating a distributed response. Once the actor acts on the original collaborative trigger, the suppression enacted by the various nodes is cleared.

An example of a DDCS is a distributed database. A distributed database is configured for efficient query-response type operation. These types of systems lack a scalable means for providing notifications within the network. For example, one mechanism for providing notifications is to distribute an event in a query. Distributed events are pushed out among the nodes of the DDCS. This often results in the nodes of the DDCS being overwhelmed. Within a DDCS with hundreds of nodes, for example, the number of notification queries that may be generated may overwhelm the bandwidth and processing capabilities of nodes within the DDCS.

Triggers are another example of a notification mechanism. Triggers are used within a data source, e.g., a particular Relational Database Management System (RDBMS), to indicate the occurrence of an event. The triggers operate on a local level purely within a particular RDBMS and, as such, are not scalable throughout a larger computing environment such as a DDCS.

An alternative mechanism to transmitting events is to implement a polling mechanism where nodes poll other nodes to determine whether new and/or different information is available. Polling, for example, would involve querying nodes periodically to determine whether new and/or updated data is available. Polling, however, consumes significant system resources regardless of whether anything new and/or different within the system is reported.

Collaborative triggers provide for an efficient notification mechanism for collective events that do not overwhelm the DDCS or otherwise flood the DDCS with notifications. For example, collaborative triggers may be applied to partitioned data across a network that can subsequently be gathered efficiently with a distributed aggregation query. In one or more embodiments, nodes within a DDCS are capable of notifying actor(s) on behalf of the network of the occurrence of particular event types that require a distributed response. The term "actor", as used within this specification, refers to a designated node of a DDCS and/or a computing system coupled to a DDCS executing a particular client application.

Other nodes of the DDCS are prevented from repeating the same type of notification (e.g., collaborative event) until one of the actor nodes has enacted a distributed response to the notification. The distributed response effectively clears collaborative trigger suppression mechanisms implemented within the nodes of the DDCS that suppress further collaborative triggers of the same or similar type. The suppression that is enacted facilitates efficient global notification throughout the DDCS without flooding the DDCS with notifications from each different node.

One or more other embodiments are directed to performing table discovery in a DDCS. In accordance with the inventive arrangements, nodes within a DDCS are capable of detecting updates to data sources. For example, a data source may generate an event in response to a data structure contained therein having been modified. The node corresponding to the updated data source is capable of detecting the generated event and, in response, distributing a collaborative trigger. The collaborative trigger is distributed from the selected node to other nodes in the DDCS and on to an actor that is configured to respond to the collaborative trigger. Since a collaborative trigger is utilized, other nodes within the DDCS are prevented from propagating collaborative triggers of the same type as the collaborative trigger originally issued until such time that the actor acts on the original collaborative trigger.

In particular embodiments, the response to the collaborative trigger is a query. The query may be an aggregation query. For example, an actor is capable of issuing an aggregation query to retrieve table definition information from other nodes of the DDCS. Since the collaborative trigger indicates an update to a data source, further collaborative triggers also relating to an update, a same type of update, or a similar type of update to the data source and/or to other data sources (e.g., as may be generated by other nodes of the DDCS) are suppressed. The actor is able to respond to the original collaborative trigger when appropriate. The issued aggregation query is distributed throughout the DDCS to obtain table definition information from nodes of the DDCS thereby retrieving updated table definition information for the data source for which the original collaborative trigger was generated and also for any data sources for which collaborative triggers may have been suppressed.

Once the updated table definition information is received by an actor, the actor node is capable of exposing the updated table definition information to other nodes and/or applications that access the DDCS. Further, each node of the DDCS, in response to receiving the response (e.g., the query) from an actor, is capable of discontinuing the suppression of collaborative triggers of the same type as the original collaborative trigger for which the response was received.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
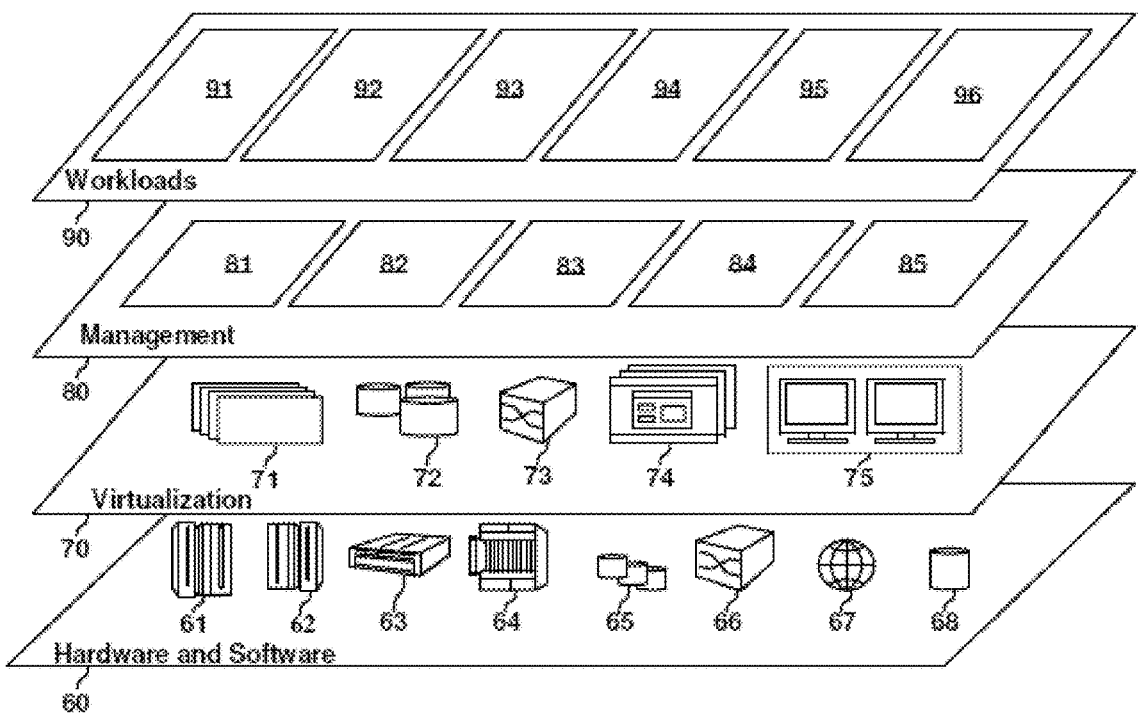
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and node management 96. Node management 96 may be operable across a plurality of nodes within a DDCS to perform query translation, query propagation, aggregation including distributed aggregation, collaborative trigger handling, and other operations as described herein in greater detail below.

Figure 3:
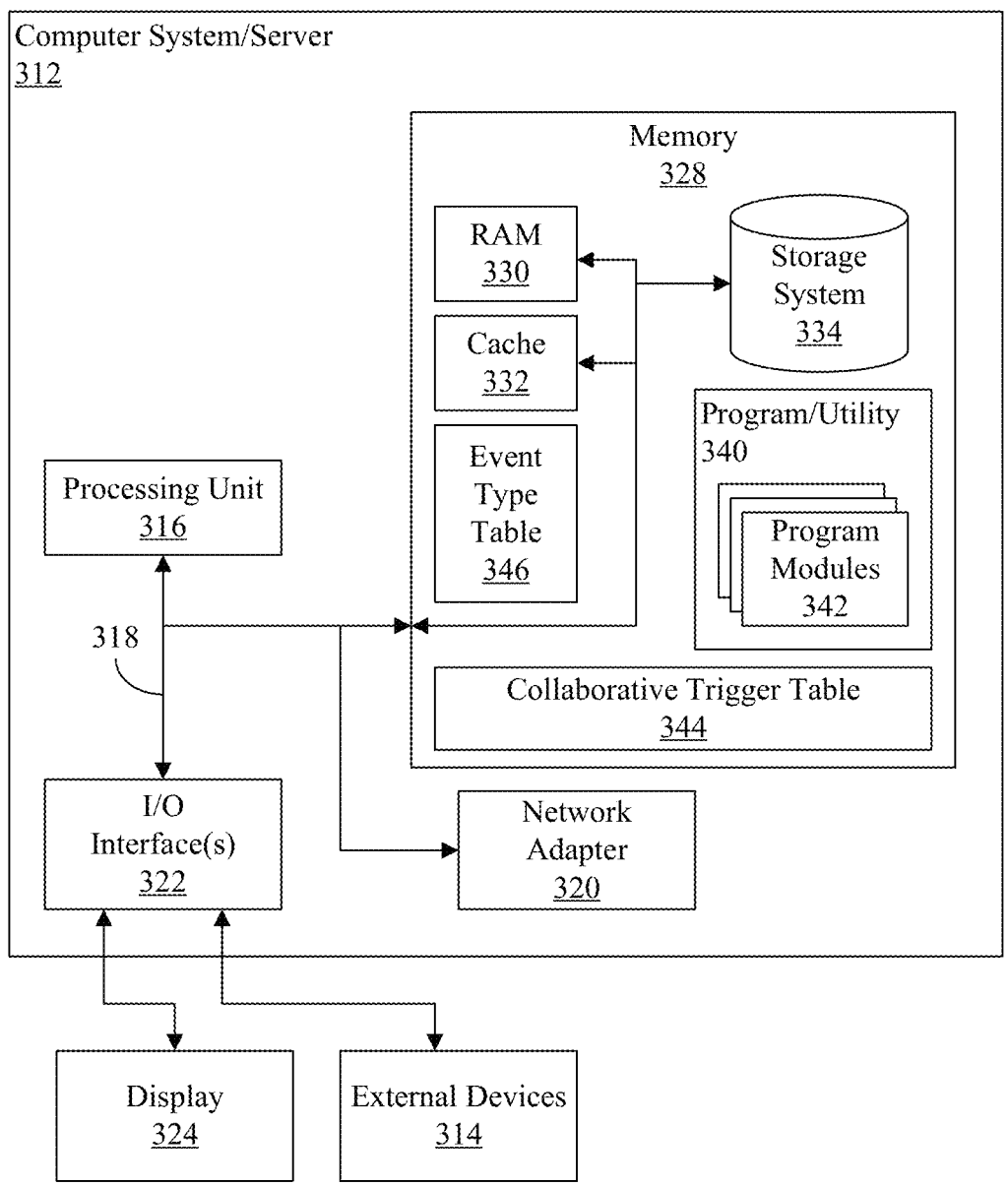
FIG. 3 depicts an example of a computing node.

FIG. 3 illustrates an example of a computing node 300. In one or more embodiments, computing node 300 is a cloud computing node. Computing node 300 is only one example of a suitable cloud computing node and is not intended to suggest any limitation as to the scope of use or functionality of embodiments of the invention described herein. Regardless, computing node 300 is capable of being implemented and/or performing any of the functionality set forth hereinabove.

Computing node 300 includes a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in computing node 300 is shown in the form of a general-purpose computing device. The components of computer system/server 312 may include, but are not limited to, one or more processors or processing units 316, a system memory (or "memory) 328, and a bus 318 that couples various system components including memory 328 to processing unit 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that is accessible by computer system/server 312, and may include both volatile and non-volatile media and/or removable and non-removable media.

Memory 328 can include computer system readable media in the form of volatile memory, such as random access memory (RAM) 330 and/or cache memory 332. Computer system/server 312 may further include other removable/non-removable, volatile/non-volatile computer system storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. For example, one or more of the program modules may include node management 96 or portions thereof (not shown). Further examples of program modules may include a collaborative trigger table 344 and/or an event type table 346. Program/utility 340 is executable by processing unit (e.g., processor) 316. Program/utility 340 and any data items used, generated, and/or operated upon by computing node 300 are functional data structures that impart functionality when employed by computing node 300.

In the example of FIG. 3, collaborative trigger table 344 is capable of storing a list of query identifiers (IDs). In general, query IDs of collaborative triggers are correlated with event types as will be described herein in greater detail below. Computing node 300 is capable of creating an entry in collaborative trigger table 344 for each collaborative trigger distributed by computing node 300. The created entry specifies the query ID of the collaborative trigger. The entry remains within collaborative trigger table 344 until computing node 300 receives a response from an actor corresponding to created entry (e.g., query ID). In response to receiving a response for a collaborative trigger with a particular query ID, computing node 300 removes the entry with the query ID from collaborative trigger table 344.

In the example of FIG. 3, event type table 346 stores a list of particular, or enumerated, types of events that occur within data sources and/or any type of entity of a DDCS, e.g., an endpoint entity or node, that has registered a change. Event type table 346 is capable of storing an associated query ID for each type of event. In particular embodiments, computing node 300, in response to detecting a particular type of event, is able to determine whether to generate a collaborative trigger for the detected event based upon whether the type of the event that is detected is listed in event type table 346. In response to determining that the event type is an enumerated type of event based upon event type table 346, computing node 300 further is capable of determining the query ID associated with the type of detected event. If a collaborative event is distributed for the detected event, computing node 300 determines the query ID for the collaborative event from event type table 346.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via input/output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

While computing node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

FIGS. 1-3 are provided for purposes of illustration and not limitation. In some examples, nodes of a DDCS are coupled together via servers (e.g., cloud servers). In other examples, data sources of a DDCS are implemented external to the cloud. Similarly, nodes of the DDCS (e.g., federated database nodes) may be implemented close to the cloud, but not actually within or part of the cloud. In other cases, nodes of a DDCS may reside on premises of a user/customer.

Figure 4:
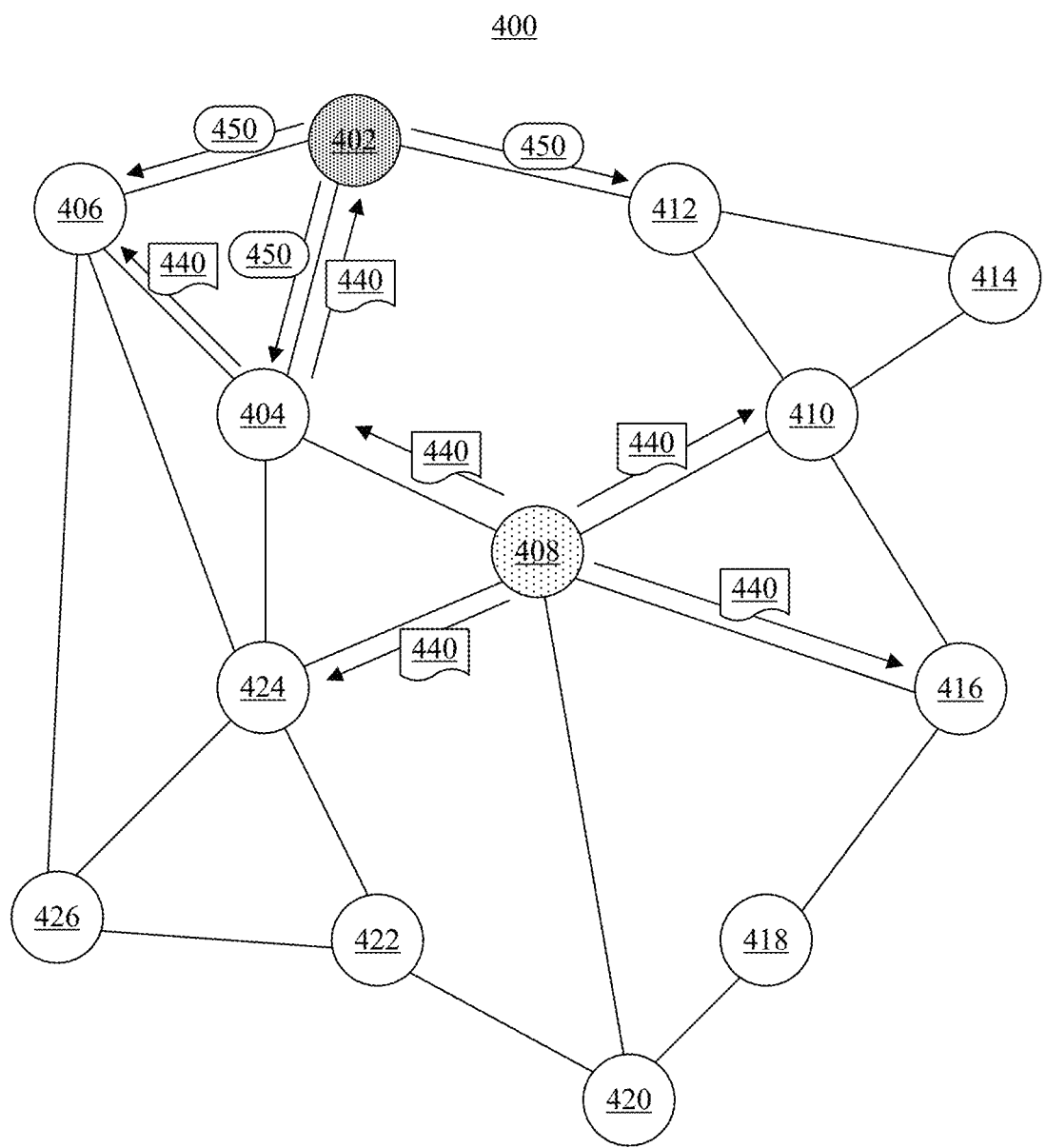
FIG. 4 depicts an example of a distributed and dynamic computing system (DDCS).

FIG. 4 illustrates an example of a DDCS 400. In the example of FIG. 4, computing system 400 includes a plurality of nodes 402, 404, 406, 408, 410, 412, 414, 416, 418, 420, 422, 424, and 426. In the example of FIG. 4, a limited number of nodes are illustrated. It should be appreciated that a DDCS may include fewer nodes than shown or more nodes than shown. Further, the DDCS may be implemented using one or more or any combination of topologies. Example topologies include hierarchical, cyclic, linear, and broad.

In the example of FIG. 4, nodes 402-426 are capable of establishing connections with one another in a dynamic manner. Selected ones of nodes 402-426 are capable of disconnecting from certain ones of nodes 402-426 and reconnecting to such nodes or other nodes on the same network. Other ones of nodes 402-426 are capable of disconnecting from certain ones of nodes 402-426 and reconnecting to such nodes or other nodes through a different network. Still other ones of nodes 402-426 are capable of maintaining relatively stable connections. Further, nodes 402-426 may be geographically distributed over large distances.

Each of nodes 402-426 may be implemented as a data processing system executing suitable operational software. For example, each of nodes 402-426 may be implemented using an architecture the same as, or similar to, the architecture described in connection with FIG. 3. Each of nodes 402-426 may execute node management 96 software or a variant of node management 96 software that is tailored to the particular functions of the node (e.g., as a node or as an actor). Other examples of nodes may include service nodes and endpoint nodes. As pictured, nodes 402-426 are interconnected.

In one or more embodiments, DDCS 400 is implemented as a federated database. A federated database facilitates a "store-locally-query-anywhere" paradigm that includes a set of interconnected nodes as illustrated in the example of FIG. 4. DDCS 400 may be implemented as an ad-hoc network of federated nodes. A federated database allows a single query to access the databases (e.g., all data sources) through the interconnected RDBMS engines. For purposes of illustration, node 402 may be an actor. A query received by or generated by an actor may be distributed throughout the federated database with results being provided back to the actor. The actor provides the results back to the original requesting node.

Other nodes within the federated database are coupled to, or include, one or more internal data sources. An example of an internal data source is an in-memory data-cache or an internal and/or embedded database. Other examples of internal data sources include, but are not limited to, log files, network connection and/or data source metadata, and sensor data. Each node may also be coupled to zero, one, or more external data sources. Examples of external data sources include one or more different RDBMSs or other data sources such as flat files of data records.

In particular embodiments, each node of a federated database may be implemented as a federated Relational Database Management System (RDBMS) engine. Each of the nodes is able to query across the internal data sources and external data sources as if the data sources were one logical database. For purposes of illustration, nodes 404-426 may be implemented as such nodes.

In the example of FIG. 4, the internal and external data sources coupled to the various nodes are not shown. In this example, node 408 is the originator of a collaborative trigger that propagates throughout DDCS 400. For example, node 408 is capable of detecting an event that occurs within an internal and/or an external data source managed by node 408. Node 408 is capable of determining the type of event that is detected. For one or more specific types of events, node 408 is capable of distributing a collaborative trigger 440.

In the example of FIG. 4, node 408 originates collaborative trigger 440. Node 408 generates and forwards collaborative trigger 440 to one or more other nodes within DDCS 400. In one or more embodiments, each collaborative trigger includes or specifies a query identifier (ID). The query ID of each collaborative trigger is correlated with the particular type of event detected in a data source that served as the cause for generating the collaborative trigger.

In conventional distributed databases, query IDs are used to track individual queries. In this regard, each query is assigned a unique query ID for purposes of tracking that particular query. In the example of FIG. 4, collaborative triggers are assigned query IDs that are correlated with the type of event that was detected and that initiated the collaborative trigger. Thus, a first collaborative trigger generated by a first node in response to a first event may have a same query ID as a second collaborative trigger generated by the first node or a different node in response to a second event so long as the first event and the second event are of a same type.

For purposes of illustration and not limitation, collaborative trigger 440 has a query ID of "4". The query ID of 4 indicates the particular type of event detected from a data source managed by node 408. In the example of FIG. 4, node 408 sends collaborative trigger 440 to nodes 404, 410, 424, and 416. Collaborative trigger 440 continues to propagate through nodes 404-426 of DDCS 400. Node 408, as the originator of collaborative trigger 440, creates an entry within the collaborative trigger table contained therein. The entry specifies the query ID of 4. Similarly, any node that receives and/or forwards collaborative trigger 440 creates an entry within the collaborative trigger table contained therein. The entry specifies the query ID of 4. Within this disclosure, the term "distribute", as applied to a collaborative trigger, means generating (e.g., originating) a collaborative trigger, receiving a collaborative trigger from another node, or sending or forwarding a collaborative trigger to another node.

In one or more embodiments, any time that a node detects an event of a type that would trigger the distribution of a collaborative trigger, that node is capable of comparing the query ID corresponding to the collaborative trigger with entries stored in the collaborative trigger table contained therein. In response to determining that a query ID of a collaborative trigger, whether a collaborative trigger that is to be generated and/or a collaborative trigger received from another node, matches a query ID specified by an entry stored in the collaborative trigger table, the node suppresses the collaborative trigger.

For example, subsequent to collaborative trigger 440 having a query ID of 4 propagating through DDCS 400, each node would have an entry specifying a query ID of 4 stored in the collaborative trigger table contained therein. As such, each node would suppress any further collaborative trigger(s) with a query ID of 4 so long as the entry specifying the query ID of 4 remains in the collaborative trigger table contained within that node.

If a node determines that the query ID of a collaborative trigger does not match any query IDs specified by entries stored within the collaborative trigger table, the node distributes the collaborative trigger to one or more other nodes. For example, in response to node 404 receiving collaborative trigger 440, node 404 determines whether the collaborative trigger table contained therein includes an entry specifying the trigger ID of 4. If so, node 404 suppresses collaborative trigger 440. For example, node 404 would not forward collaborative trigger 440 to any other node. If, for example, node 404 determines that the collaborative trigger table contained therein does not have an entry specifying the query ID of 4, node 404 does distribute collaborative trigger 440 to one or more other nodes. In the example of FIG. 4, node 404 is capable of distributing collaborative trigger 440 to actor 402 and to node 406.

Subsequent to node 404 distributing collaborative trigger 440, node 404 creates an entry in the collaborative trigger table contained therein. The entry specifies the query ID of 4. Accordingly, once collaborative trigger 440 propagates through DDCS 400, a node such as node 404 will not originate or forward any other collaborative trigger having a query ID of 4 until the entry specifying the query ID of 4 is removed from the collaborative trigger table contained therein. Node 404, for example, is capable of originating and/or forwarding a collaborative trigger having a query ID of 1 presuming that the collaborative trigger table of node 404 does not contain an entry specifying a query ID of 1. Once the collaborative trigger is distributed and an entry specifying a query ID of 1 is created within the collaborative trigger table of each endpoint that distributes the collaborative trigger, the nodes all suppress any further collaborative triggers that have a query ID of 1 also.

Nodes are capable of continuing to propagate collaborative trigger 440 as described. At some point, actor 402 receives collaborative trigger 440. Actor 402 is capable of generating a response 450 to collaborative trigger 440. The timing of response 450 to collaborative trigger 440 may be immediate or at some time subsequent to the receipt of collaborative trigger 440 by actor 402 depending upon, for example, the workload and/or capacity of actor 402 or a watchdog timeout. In the case of an actor application, the response may come as a result of a user action. In the case of a user action, without the occurrence of the user action, the actor may not provide a response. In any case, if/when actor 402 issues response 450 in response to collaborative trigger 440, response 450 is distributed throughout the nodes of DDCS 400.

In one or more embodiments, if or when new nodes connect to a network, or when networks merge, all event types are automatically propagated within the combining networks. This behavior accommodates the case of fragmented networks that reconnect to each other. As networks form, all event types will be continually triggered and suppressed. Actors can control how long to wait between the "data-gathering response queries" to regulate resource consumption workload.

As each node receives response 450, that node removes or deletes the entry created within the collaborative trigger table corresponding to collaborative trigger 440. More particularly, continuing with the example where collaborative trigger 440 has a query ID of 4, as each node receives and/or forwards response 450 within DDCS 400, that endpoint searches for the entry stored within the collaborative trigger table contained therein specifying a query ID of 4 and deletes and/or removes the entry. Once the entry specifying the query ID of 4 is deleted from a collaborative trigger table of a node, that node no longer suppresses collaborative trigger(s) having a query ID of 4 (e.g., the query ID of the record or entry that is deleted from the collaborative trigger table).

As noted, DDCS 400 may include a changing number of nodes and/or data sources as devices drop off and dynamically reconnect to nodes. As such, DDCS 400 may include fewer or more nodes than are illustrated in the example of FIG. 4. Further, the topography of DDCS 400 may vary from that illustrated in FIG. 4. DDCS 400 may have a hierarchical, cyclic, linear, or broad topology and/or any combination of the aforementioned topologies. Accordingly, FIG. 4 is provided for purposes of illustration and not limitation.

Though not discussed specifically, it should be appreciated that other ones of the nodes illustrated in FIG. 4 are capable of performing the same or similar operations described in connection with any of the nodes described herein. For example, each of the nodes is capable of generating collaborative triggers, receiving collaborative triggers, forwarding collaborative triggers, maintaining a collaborative trigger table, and selectively suppressing collaborative triggers based upon a matching of query ID(s) to query ID(s) specified by entries stored in the collaborative trigger table maintained in each respective node.

FIGS. 5-9 illustrate various methods for processing collaborative triggers within a DDCS. FIGS. 5-9 are generally described from the perspective of a particular node within a DDCS or a particular actor as described within this disclosure. The operations described in FIGS. 5-9, for example, may be performed concurrently or in alternating fashion to process detected events, collaborative triggers, and/or responses to collaborative triggers. It should be appreciated that as certain functionality described may be implemented within each node of a DDCS, the various communications, e.g., collaborative triggers and/or responses, are propagated throughout the DDCS through interaction of the nodes among themselves and/or with actor(s).

Figure 5:
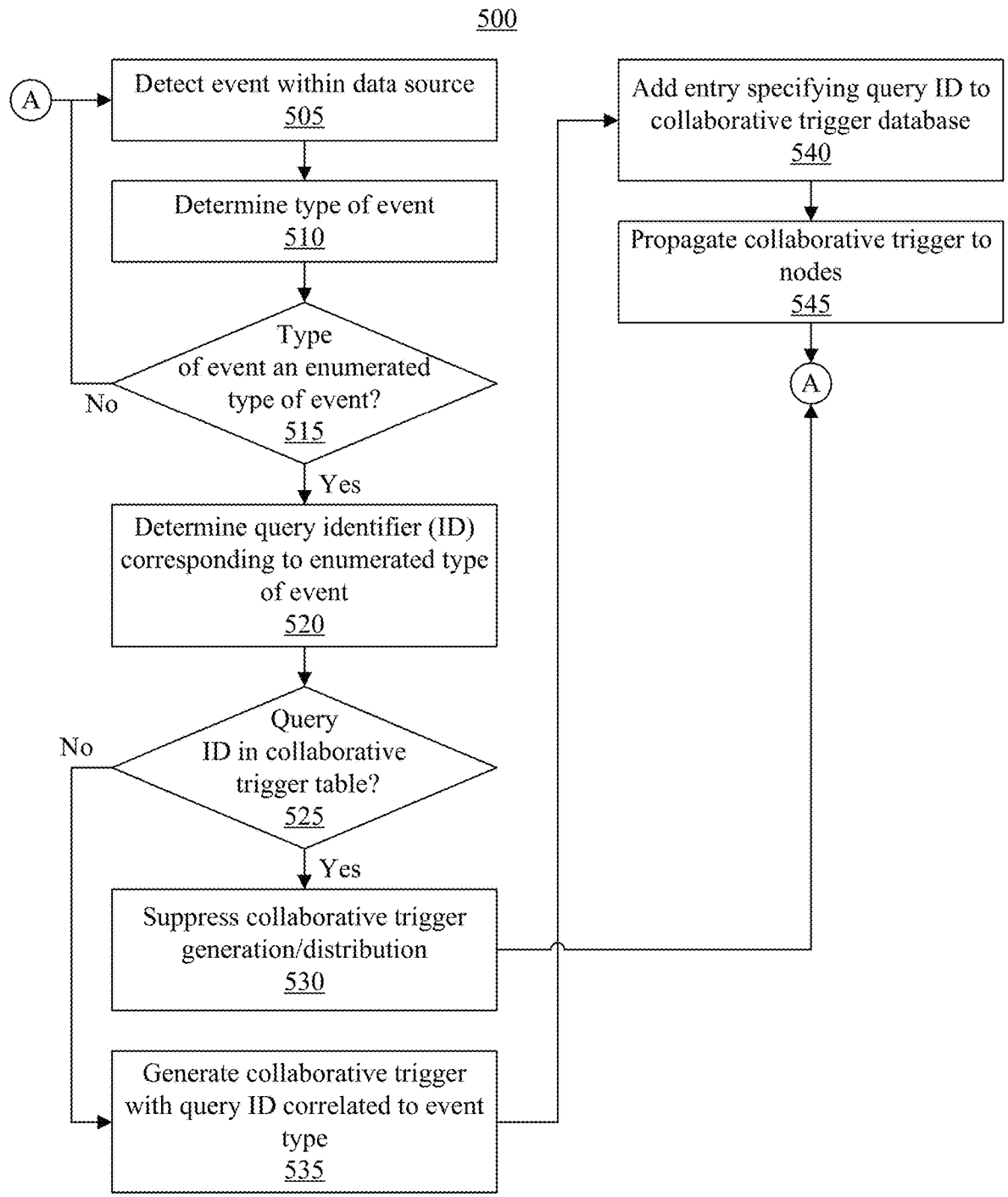
FIG. 5 depicts an example method for implementing collaborative triggers within a DDCS.

FIG. 5 depicts an example method 500 of implementing collaborative triggers within a DDCS. More particularly, method 500 illustrates example operations performed by a node in originating a collaborative trigger. Though not shown in the example of FIG. 5, the node is capable of performing other operations and/or functions while performing the operations illustrated in the example of FIG. 5.

In block 505, a node detects an event within a data source of the node. In one or more embodiments, the node is capable of detecting a trigger generated within a data source of the node. The data source may be an internal data source or an external data source. In one or more other embodiments, the node is capable of monitoring files (e.g., data structures) to determine whether a file has changed. For example, the node is capable of monitoring time stamps on files and detecting when a file is updated by virtue of a changed or modified time stamp.

In one or more other embodiments, the node may have a local cache of information from the data source and is capable of comparing the current state with the cached copy to detect an event. For example, the node has a local cache of the table definitions that were previously found on the data source and is capable of comparing the current table definitions with those in the cache to detect the creation, deletion, or modification of a table or view.

In block 510, the node determines the type of the event. Examples of different types of events include, but are not limited to, creation of a new table, deletion of a table, modification of a table, creation of a new view, deletion of a view, and modification of a view. Further examples of event types include, but are not limited to, creation of an index, deletion of an index, creation of a new row in a table, deletion of a row in a table, modification of a row in a table, updated statistics, and reorganizing data pages on disk.

In block 515, the node determines whether the type of the event detected in block 505 is an enumerated type of event. For example, the node is capable of determining whether the detected event matches one that is specified within the event type table stored therein. In one or more embodiments, the enumerated event types that may be specified by the event type table include table-level and/or view-level events. Examples of event types specified by the event type table include table and/or view creation events, table and/or view deletion events, and/or table and/or view modification events. In particular embodiments, table-level and/or view-level events corresponding to modifications indicate a structural change to a table or a view such as the addition or deletion of a column of the table or view. If the type of event determined in block 510 matches an event type in the event type list, the node determines that the detected event is an enumerated type of event for which a collaborative trigger may be generated.

Other examples of enumerated types of events that may be listed in the event type table include a sensor reading change (e.g., temperature) or a cloud infrastructure monitoring agent event (e.g., CPU or memory usage alerts). Such events illustrate application events since an application can subsequently gather aggregate information about the changes. For example, the application, executing in a computing system and/or node, is capable of reporting the changes through a user interface or act upon the changes in other ways. In one example, the application is capable of increasing a pool of cloud resources.

Other examples of events that may not be included in the event type table that are not suitable or are less suitable for use with collaborative triggers may include a computer virus alert (e.g., if the node should be isolated as soon as possible). Another example is an update to a minimally distributed table such as one node or a handful of nodes with data that is independent from all data elsewhere in the network. A status throughput at a given node is an example of data that is minimally distributed or independent of data elsewhere in the network. These types of events would only occur in a small cluster of nodes and bear no relation to the more globally distributed data. As such, for event types that are not enumerated, a standard distributed query with an embedded stored procedure could just be issued to inform an application.

In any case, if the event type is an enumerated event type, method 500 continues to block 520. If the event type is not an enumerated type of event, method 500 loops back to block 505.

In block 520, the node determines the query ID that corresponds to the enumerated type of event. For example, the node determines the query ID from the event type table, which specifies a mapping or correlation between the event types and query IDs. In particular embodiments, the event type table specifies a one-to-one mapping of query IDs to types of events. In other embodiments, more than one type of event may be mapped to a same query ID. For example, two or more different types of events may be mapped to a same query ID if the actor response to the collaborative trigger resulting from each different type of event would be the same.

In block 525, the node determines whether the query ID determined in block 520 is listed within the collaborative trigger table stored within the node. If the query ID is specified by an entry stored in the collaborative trigger table, method 500 continues to block 530. If the query ID is not listed in the collaborative trigger table, method 500 continues to 535.

In block 530, the node suppresses collaborative trigger distribution. In response to determining that the query ID is already specified within the collaborative trigger table, the node does not generate a collaborative trigger for the event detected in block 505. In effect, the node skips the generation of a collaborative trigger for the event and does not forward any collaborative trigger for the event detected in block 505. After block 530, method 500 loops back to block 505 to continue processing.

In block 535, the node generates a collaborative trigger with the query ID determined in block 520. In block 540, the node adds an entry specifying the query ID determined in block 520 to the collaborative trigger database stored therein. In block 545, the node propagates (e.g., forwards) the collaborative trigger generated in block 535 to one or more other nodes within the DDCS.

FIG. 5 illustrates an example of how a node is capable of suppressing collaborative triggers by refraining from the creation of collaborative triggers that would have a particular query ID while that node is awaiting a response to a prior collaborative trigger of the same query ID. Each node is capable of utilizing the collaborative trigger table stored to track whether a response to a collaborative trigger with a particular query ID is still outstanding. In general, each node is configured to suppress collaborative triggers of a particular query ID until such time that a response from the actor corresponding to that particular query ID is received by the node. This capability prevents redundant notifications from being generated within the DDCS.

Figure 6:
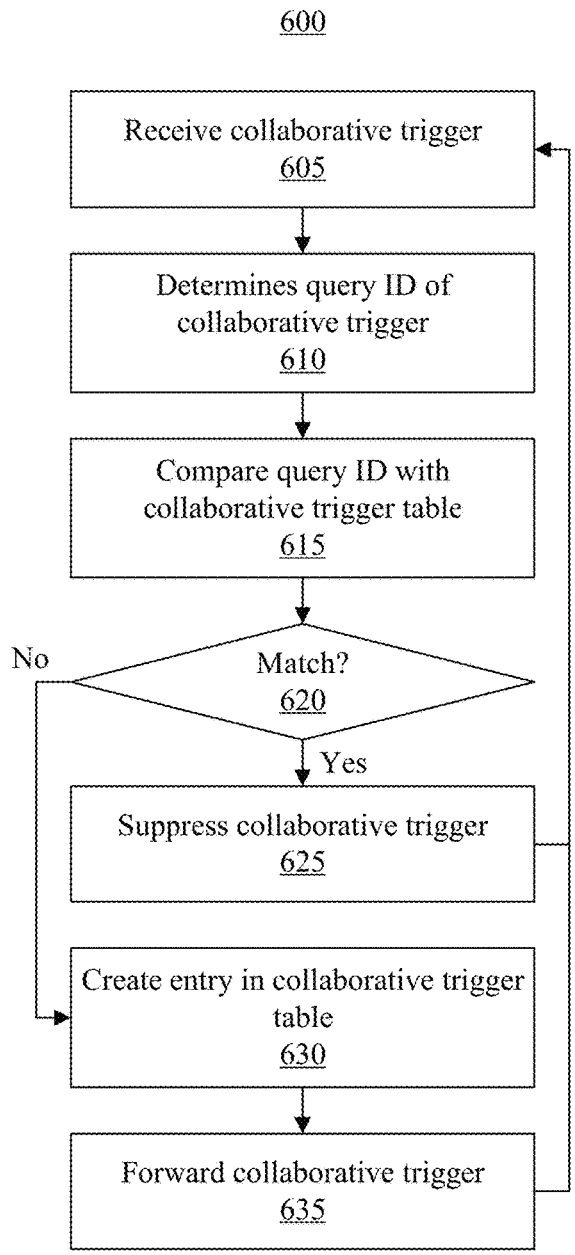
FIG. 6 depicts another example method for implementing collaborative triggers within a DDCS.

FIG. 6 depicts another example method 600 of implementing collaborative triggers within a DDCS. More particularly, method 600 illustrates example operations performed by a node in processing a collaborative trigger received from another node. As collaborative triggers propagate through the DDCS, the possibility exists that any given node may receive a collaborative trigger with a particular query ID and subsequently receive the same collaborative trigger (with the same query ID) from a different node or subsequently receive a different collaborative trigger having a same query ID as a previously received collaborative trigger. Method 600 illustrates an example of how to prevent continued forwarding of redundant collaborative triggers through the DDCS.

In block 605, the node receives a collaborative trigger from another node. The collaborative trigger that is received may have been generated by the forwarding node or generated by a node other than the forwarding node.

In block 610, the node determines the query ID of the collaborative trigger received in block 605. In block 615, the node compares the query ID determined in block 610 with the query IDs specified by the entries stored in the collaborative trigger table stored therein. In block 620, the node determines whether the query ID of the received collaborative trigger matches any of the query IDs specified within the collaborative trigger table.

In response to determining that the query ID matches an entry within the collaborative trigger table, method 600 proceeds to block 625. In block 625, the node suppresses the collaborative trigger received in block 605. In particular, the node takes no further action in response to the collaborative trigger and does not forward the collaborative trigger to any other node within the DDCS. After block 625, method 600 may loop back to block 605 to continue processing.

In response to determining that the query ID does not match any entry within the collaborative trigger table, method 600 proceeds to block 630. In block 630, the node creates an entry in the collaborative trigger table stored therein. The newly created entry specifies the query ID determined in block 610. In block 635, the node forwards the collaborative trigger to one or more other endpoints and/or to an actor.

Method 600 illustrates an example of how the nodes within the DDCS are able to suppress and/or forward collaborative triggers based upon whether the query ID of the collaborative trigger matches entries within the collaborative trigger table stored within each respective node. As discussed, an entry for a query ID stored within the collaborative trigger table of a node means that a response from the actor for the query ID is still outstanding. This mechanism allows each node to suppress collaborative triggers of the same type, as indicated by the query ID, and prevent the DDCS from being flooded with duplicates of a collaborative trigger and/or different collaborative triggers of the same type.

Figure 7:
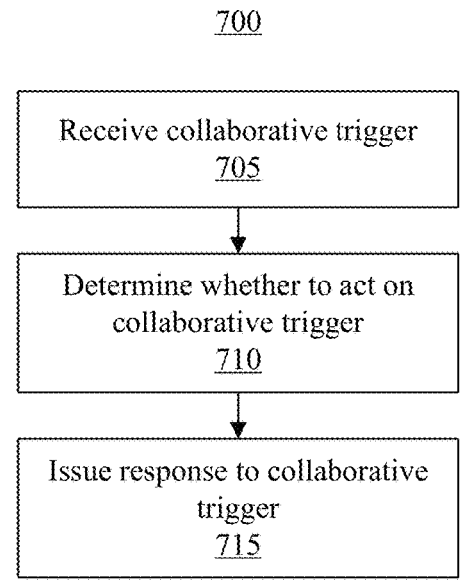
FIG. 7 depicts an example method for processing a collaborative trigger as performed by an actor within a DDCS.

FIG. 7 depicts an example method 700 of processing a collaborative trigger as performed by an actor within a DDCS. In block 705, the actor receives a collaborative trigger. The collaborative trigger, as described in connection with FIGS. 5-6, propagates through the DDCS among the nodes until reaching an actor of the DDCS.

In block 710, the actor determines whether to act on the collaborative trigger received in block 705. In one or more embodiments, the actor is capable of acting on the collaborative trigger immediately upon receipt. In one or more other embodiments, the actor is capable of acting on the collaborative trigger based upon the workload of the actor. For example, the actor may perform one or more other processing tasks prior to responding to the collaborative trigger. As such, the actor is able to control the workload and perform operations or respond to requests considered to be of greater urgency than the received collaborative trigger. In particular embodiments, the actor may determine an urgency of the collaborative trigger based upon the query ID. For example, the actor is capable of responding to the collaborative trigger more immediately or delaying the response to the collaborative trigger based upon the query ID of the received collaborative trigger. An actor, for example, is capable of acting on the collaborative trigger at any time. As such, the DDCS may remain in a suppressed state, at least with respect to the query ID, for an extended period of time.

In one or more embodiments, the decision whether to act on a collaborative trigger is application-driven. For example, an application may be notified of a collaborative trigger at a later point in time, such as when a user takes an action. The action may be activating a control (e.g., clicking a button) to query updated information. If the user action does not occur, the response is not issued. In this example, the response to the collaborative trigger follows more of an asynchronous notify/query model. Though not shown in the example of FIG. 9, the actor is capable of performing other operations until a determination is made to act on the collaborative trigger.

In response to determining that actor is ready to act on the received collaborative trigger, in block 715, the actor issues a response to the collaborative trigger. The actor, for example, generates a response and forwards the response to one or more nodes. The nodes are capable of propagating or forwarding the response to other nodes. The response may be considered a distributed response and that the response propagates throughout the DDCS among the nodes.

Figure 8:
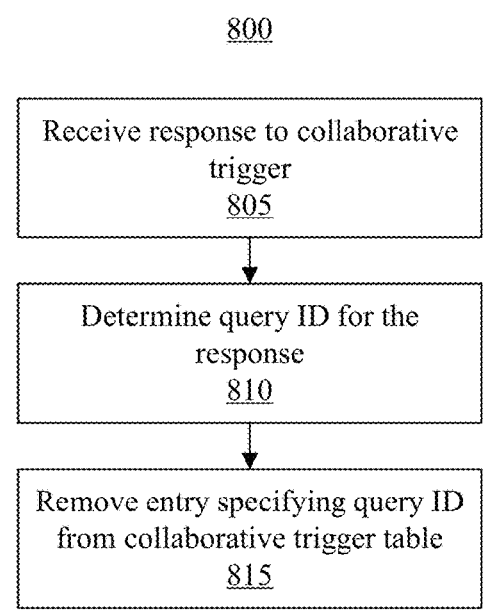
FIG. 8 depicts another example method for implementing collaborative triggers within a DDCS.

FIG. 8 depicts another example method 800 of implementing collaborative triggers within a DDCS. More particularly, method 800 illustrates the operations performed by a node in processing a response to a collaborative trigger. In block 805, the node receives a response to a collaborative trigger. The response may be received directly from an actor or may be received from another node.

In block 810, the node determines the query ID for the response. The response, for example, may specify or include the query ID of the collaborative trigger for which the response is generated.

In block 815, the node removes the entry specifying the query ID determined in block 810 from the collaborative trigger table stored therein. For example, the node searches the collaborative trigger table for an entry specifying a query ID matching the query ID determined in block 810. In response to locating the matching entry, the node removes or deletes the entry from the collaborative trigger table. Once the entry is removed from the collaborative trigger table, the node no longer suppresses collaborative triggers that have the same query ID as determined in block 805.

Figure 9:
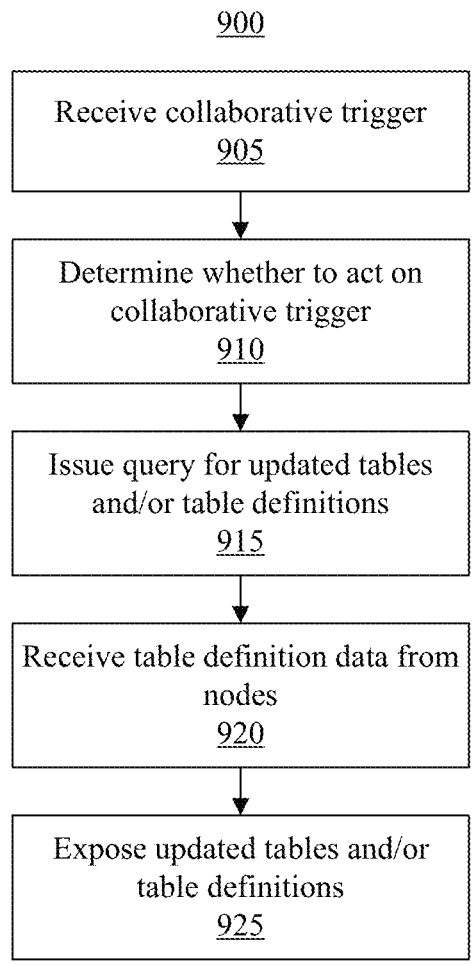
FIG. 9 depicts an example method for table discovery within a DDCS.

FIG. 9 depicts an example method 900 for table discovery within a DDCS. Method 900 may be performed by an actor node. Method 900 illustrates an example where the actor is capable of discovering a table and providing a name to the data structure without having any specific information about the provenance of the data structure.

In the example of FIG. 9, collaborative triggers are used as a mechanism for performing table discovery. In one or more embodiments, the event that is detected from a data source by a node as described in connection with FIG. 5 may be one that indicates a new data structure, a deleted data structure, or a modified data structure within a data source. For instance, the event may be a "table configuration update" event. The data structure may be a table or a view, for example.

Examples of changes to a data structure that may trigger an event include, but are not limited to, the creation of a new table as indicated by a new table event, deletion of a table as indicated by a table deletion event, a table modification event (e.g., the addition of a new column to an existing table and/or the removal of a column from an existing table), column position changes, and/or data type or size alterations or any other table definition change. Similar events relating to views may be detected. Accordingly, in one or more embodiments, the detected event is an update to a configured view of the data source. A view refers to a searchable object in a database that is defined by a query. A view can be queried like a table, but does not store data. A view is capable of combining data from two or more tables. A configured view refers to a view that is persisted and made available by a data store.

Other examples of events that may cause a collaborative trigger can include peer-node connection establishment or disconnection.

In block 905, the actor receives a collaborative trigger from a node of the DDCS. In block 910, the actor determines whether to act on the collaborative trigger. For example, the actor may act on the collaborative trigger immediately or subsequent to performing one or more other operations. Block 910 may operate substantially as described in connection with block 710 of FIG. 7. In response to deciding to act on the received collaborative trigger, method 900 continues to block 915. Though not shown in the example of FIG. 9, the actor is capable of performing other operations until a determination is made to act on the collaborative trigger.

In block 915, the actor issues a response to the collaborative trigger. In the example of FIG. 9, the actor is capable of issuing a query as the response. The query requests updated table definition information from data sources within the DDCS. The query issued by the actor is distributed throughout the DDCS as described in connection with FIGS. 7 and 8.

In one or more embodiments, the query is an aggregation query. The actor is capable of issuing the request in a canonical format that is executable by the different nodes of the DDCS. For example, the query issued by the actor may be specified in structured query language (SQL). Each of the nodes that receives the query is capable of translating the query into a format that is executable by the data sources of that node. Any results received from the data sources by a node may be provided back to the actor.

Each of the nodes that receives the response (e.g., the query) either from the actor or a node of the DDCS, is capable of responding to the query with table definition information. For example, each node is capable of translating the query as received in the canonical format from the actor into a format that is executable by the local data sources managed by the node. In particular embodiments, the translated query requests table definitions for tables of the local data sources. The node receives the results of the query executed by the local data source(s) and provides the results back to the actor.

In one or more embodiments, the table definition information specifies each table, e.g., a name of each table, within a data source and/or each data source (e.g., internal and/or external) of the node, the name(s) of columns of the tables, the data types of cells within the columns of the table(s), and other structural information of the tables of the data source(s).

In particular embodiments, the nodes are capable of merging the table definitions received from child nodes prior to propagating results up to a parent node. A node that sends (or forwards) a query to another node is referred to as a parent node. The node that receives the query is referred to as the child node. For example, the aggregation query issued by the actor, when executed by the nodes, causes each node in the return path to merge table definitions received from each child node to avoid duplicating table names that match between the different nodes.

In block 920, the actor receives the table definition information (e.g., updated table definition information) from the nodes. The actor is capable of caching, or storing, the received table definition information therein.

In block 925, the actor is capable of exposing the received table definition information. For example, the actor is capable of exposing the tables, by way of the table definitions, as if each table was a logical table. A logical table is an abstract table (e.g., data structure) that points to one or more external data sources, each being accessed and transformed via a data-source wrapper module. For purposes of illustration, a data source is deemed external if the data source is not already managed and accessible through relational tables by the RDBMS that defines the data source. The actor is capable of exposing the results to a computing node that is external to the DDCS. The external node is capable of submitting queries to the actor.

In one or more embodiments, in block 925, the actor registers each newly discovered table as specified by the responses received in block 920. The actor node is capable of registering each newly discovered table as a view or an equivalent to a view that is exposed to computing nodes, whether nodes of the DDCS, nodes external to the DDCS that are capable of submitting queries to the actor(s), and/or to applications within such computing nodes and/or in nodes of the DDCS. In an aspect, a view refers to an abstract table (e.g., a data structure) that provides transformations of one or more locally managed tables (or abstract tables). The stored and exposed table definition data includes aggregated table definition data across the various data sources (e.g., hundreds of data sources) of the DDCS. Exposing the table definition data indicates that the data exists across these different data sources and is available as a logical view of the broader data set.

The actor, in response to receiving a query from a source outside of, or external to, the DDCS, is capable of looking up table definitions from within the memory contained therein. In this manner, the actor is capable of providing physical access to tables of the data sources of the DDCS without the need for configuration. The actor, for example, is capable of translating a query received from the external node to a format that is executable by the nodes of the DDCS. As discussed, the translated query may be in a canonical format. Further, the translated query that is submitted to the nodes is translated by the actor for execution by the nodes based upon the updated table definition data obtained through the automated table discovery process described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

generating, in response to detecting a first event of a selected type within a first node of a distributed computing system, a first collaborative trigger having a query identifier configured to indicate the selected type of the event;

distributing the first collaborative trigger through other nodes of the computing system so that the first collaborative trigger reaches an actor of the distributed computing system;

receiving, subsequent to the distributing and from the actor, a response to the first collaborative trigger; and suppressing, prior to the receiving and within each node that distributes the first collaborative trigger, each other collaborative trigger having a same query identifier as the first collaborative trigger until the response to the first collaborative trigger is received from the actor, wherein the actor is configured to initiate operations including:

generating the response to the first collaborative trigger, and forwarding the response to the other nodes.

2. The computer-implemented method of claim 1, wherein
the suppressing comprises:
in response to detecting a second event of the selected type, preventing generation of a second collaborative trigger corresponding to the second event.

3. The computer-implemented method of claim 1, further comprising, for each of the nodes that distributes the first collaborative trigger:
in response to receiving the response from the actor to the first collaborative trigger, discontinuing the suppressing of each other collaborative trigger having the same query identifier as the first collaborative trigger.

4. The computer-implemented method of claim 1, wherein
the suppressing comprises:
within each of the nodes that distributes the first collaborative trigger, adding an entry to a collaborative trigger table, wherein
the entry specifies the query identifier of the first collaborative trigger.

5. The computer-implemented method of claim 4, wherein
the suppressing comprises, for each of the nodes that distributes the first collaborative trigger:
in response to receiving a second collaborative trigger, comparing a query identifier of the second collaborative trigger with each query identifier stored in the collaborative trigger table; and
in response to matching the query identifier of the second collaborative trigger with one of the query identifiers stored in the collaborative trigger table, preventing the second collaborative trigger from propagating to another node of the distributed computing system.

6. The computer-implemented method of claim 4, wherein
the suppressing comprises, for each of the nodes that distributes the first collaborative trigger:
in response to detecting a second event, determining a query identifier correlated with a type of the second event;
comparing the query identifier correlated with the second event with each query identifier stored in the collaborative trigger table; and
in response to matching the query identifier correlated with the second event with one of the query identifiers stored in the collaborative trigger table, preventing generation of a second collaborative trigger corresponding to the second event.

7. The computer-implemented method of claim 4, further comprising, for each of the nodes that distributes the first collaborative trigger:
removing the entry specifying the query identifier of the first collaborative trigger from the collaborative trigger table in response to receiving the response to the first collaborative trigger.

* * * * *